(12) United States Patent
Sesha et al.

(10) Patent No.: US 11,880,431 B2
(45) Date of Patent: Jan. 23, 2024

(54) SYSTEM AND METHOD OF CLASSIFYING DATA AND PROVIDING AN ACCURACY OF CLASSIFICATION

(71) Applicant: Hewlett Packard Enterprise Development LP, Houston, TX (US)

(72) Inventors: Madhusoodhana Chari Sesha, Karnataka (IN); A Abdul Samadh, Karnataka (IN); Jayanth Ananthapadmanaban, Karnataka (IN); Sai Ram Ganna, Karnataka (IN); Krishna Mohan Elluru, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 118 days.

(21) Appl. No.: 17/406,792

(22) Filed: Aug. 19, 2021

(65) Prior Publication Data
US 2022/0327330 A1  Oct. 13, 2022

(30) Foreign Application Priority Data

Apr. 8, 2021  (IN) .............................. 202141016573

(51) Int. Cl.
*G06F 18/21* (2023.01)
*G06N 3/08* (2023.01)
(Continued)

(52) U.S. Cl.
CPC ........... *G06F 18/2193* (2023.01); *G06N 3/08* (2013.01); *G06N 5/01* (2023.01); *G06V 10/753* (2022.01); *H04L 43/50* (2013.01)

(58) Field of Classification Search
CPC .... G06F 18/2193; G06V 10/753; G06N 5/01; G06N 3/08; H04L 43/50
(Continued)

(56) References Cited

U.S. PATENT DOCUMENTS

| | | | | |
|---|---|---|---|---|
| 2013/0117205 | A1* | 5/2013 | Dubois | .................. G06N 20/20 706/12 |
| 2015/0161518 | A1* | 6/2015 | McCann | .................. G06N 7/01 706/12 |

(Continued)

OTHER PUBLICATIONS

"Net mate Features," retrieved at https://github.com/DanielArndt/flowtbag/wiki/features, retrieved on Feb. 1, 2022, pp. 3.
(Continued)

*Primary Examiner* — James E Springer
(74) *Attorney, Agent, or Firm* — Hewlett Packard Enterprise Patent Department

(57) ABSTRACT

A system and a method of classifying data and providing an accuracy of classification are described. The method includes determining values of statistical features associated with data packets present in a data stream. The values of statistical features are provided to a data model for producing a classification output including the data packets classified into one or more categories. While producing the classification output, the data model extracts heuristics for each of the values of statistical features, compares the heuristics with one or more conditional checks defined at each node within the data model, and determines a cumulative score based on results of the comparing. The cumulative score is determined by aggregating a score assigned to successful clearance of each conditional check. The cumulative score indicates an accuracy of the classification output.

20 Claims, 5 Drawing Sheets

(51) Int. Cl.
 H04L 43/50 (2022.01)
 G06V 10/75 (2022.01)
 G06N 5/01 (2023.01)
(58) Field of Classification Search
 USPC .......................................................... 709/224
 See application file for complete search history.

(56) References Cited

U.S. PATENT DOCUMENTS

| | | | | |
|---|---|---|---|---|
| 2020/0169509 | A1* | 5/2020 | Tigli | H04L 47/2441 |
| 2021/0160261 | A1* | 5/2021 | Kwatra | H04L 63/1425 |
| 2021/0160266 | A1* | 5/2021 | Sternby | H04L 63/1425 |
| 2021/0303984 | A1* | 9/2021 | Lan | G06N 20/20 |
| 2023/0089187 | A1* | 3/2023 | Peng | H04L 63/20 726/22 |

OTHER PUBLICATIONS

Boutaba, R., et al., "A comprehensive survey on machine learning for networking: evolution, applications and research opportunities," Journal of Internet Services and Applications, vol. 9, May 12, 2018, pp. 1-99.
Marín, G., et al., "Deep in the Dark—Deep Learning-Based Malware Traffic Detection Without Expert Knowledge," 2019 IEEE Security and Privacy Workshops (SPW), Sep. 19, 2019, pp. 36-42.
Yasutaka, F., et al., "ResNet and Batch-normalization Improve Data Separability," Proceedings of Machine Learning Research, vol. 101, 2019, pp. 94-108.
Yeo, M., et al., "Flow-based malware detection using convolutional neural network," 2018 International Conference on Information Networking (ICOIN), vol. 2018, Jan. 10, 2018, pp. 910-913.

* cited by examiner

```
if (pktl_std <= 3):
        label = TELNET
else if (pktl_std > 3):
        if (pktl_mean <= 43):
                label = HTTP                    # rule 1, explainability score (2/6 = 0.33)
        else if (pktl_mean > 43):
                if (iat_mean <= 16720):
                        if (pktl_mean <= 52):
                                label = LIME
                        else if (pktl_mean > 52):
                                label = HTTP    # rule 2, explainability score (3/6 = 0.5)
```

| | Mean packet length | Standard packet length | Mean inter arrival time | Standard inter arrival time | Packets per second | Bits per second |
|---|---|---|---|---|---|---|
| Minimum value | 40 | 1 | 325 | 1 | 8.30E-09 | 9.21E-07 |
| Mean -ve standard value | -891.718 | -1298.26 | -21653.4 | 26835.72 | -4.64E-05 | -7.00E-02 |
| Mean +ve standard value | 3133.147 | 2648.212 | 254239.3 | 247169.9 | 1.45E-04 | 0.22 |
| Maximum value | 8476 | 8169 | 1286994 | 1096370 | 1.07E-03 | 1.098 |
| Exemplary input vector | 8398 | 7961 | 36924 | 113668 | 2.71E-05 | 0.2274545 |
| Intermediate Explainability score | 0.3 | 0.3 | 0.3 | 0.6 | 0.6 | 0.3 |

Fig. 5

SYSTEM AND METHOD OF CLASSIFYING DATA AND PROVIDING AN ACCURACY OF CLASSIFICATION

BACKGROUND

In computer networks, several network devices may be configured to store, receive, and forward data packets. To maintain privacy and security of data, the data packets may often be communicated in an encrypted format. Due to explosive growth in technologies, such as Internet of Things (IoT), Bring Your Own Device (BYOD), and Wireless Sensor Networks (WSN), the data communicated over the computer networks has grown vastly. To maintain efficient functioning of the network devices and the overall computer network, such vast amount of data is often required to be analyzed using data models. Such analysis provides details related to deviations, degradations, and violations of network policies that result in degradation in performance of the computer networks.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles related to the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings:

FIG. 5 illustrates a table providing different values determined by a system for classifying data and providing an accuracy of classification, in accordance with an embodiment of the present disclosure.

DETAILED DESCRIPTION

Figure 1:
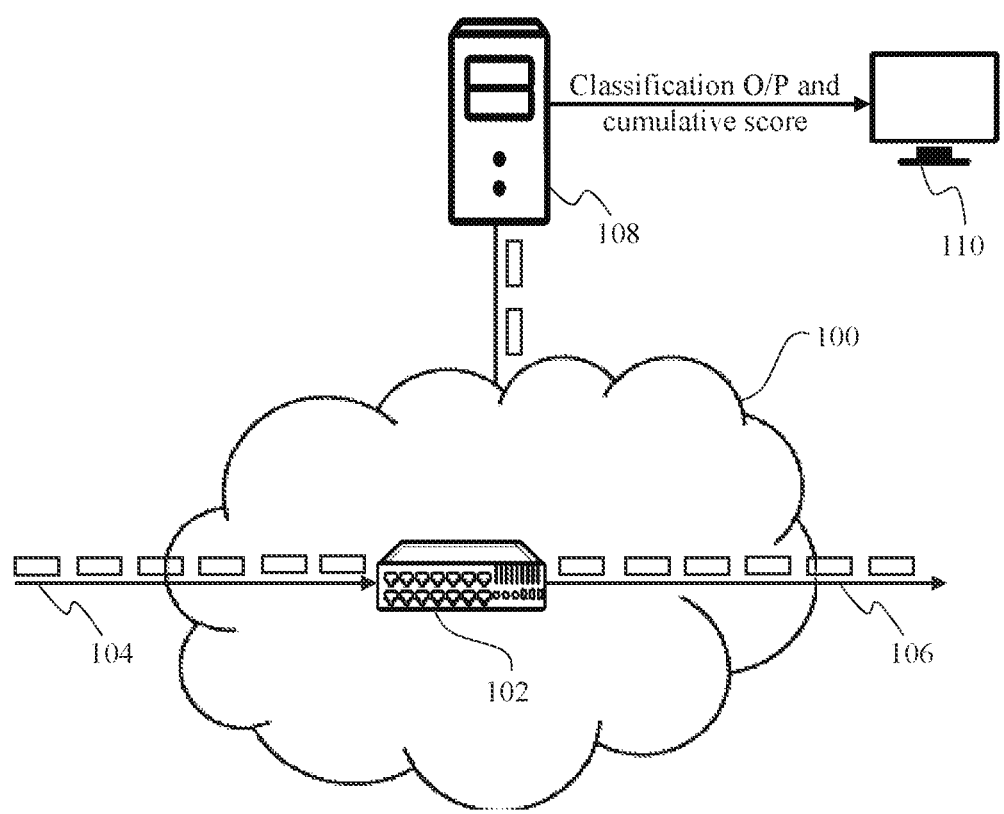
FIG. 1 illustrates a network implementation diagram of a system for classifying data and providing an accuracy of classification, in accordance with an embodiment of the present disclosure.

Data models are generally used for classification of data packets or data streams communicated over computer networks. Classification of the data packets may be performed to understand behavior and properties of the data packets, and adherence of the data packets to network policies. Classification of the data packets may be an arduous process when the data packets are present in an encrypted format because gaining values of different fields from the data packets for performing classification becomes difficult.

Using conventional data models, it is only possible to obtain a classification output that includes the data packets classified into one or more predefined categories. Conventional data models do not provide information about a certainty with which they have classified the data packets. Further, performance of the data models may degrade over a period of time due to change in actual data required to be classified with respect to training data used for training the data models before deployment. Thus, the data models may wrongly classify the data packets. Therefore, using conventional data models, it is not possible to understand whether the data packets are correctly classified, incorrectly classified, or there is an uncertainty associated with classification of the data packets. With such uncertainty or incorrect classification of the data packets, appropriate actions to manage performance of the computer networks cannot be taken.

In order to address the above challenges, disclosed embodiments provide a method of providing insight related to performance of a data model that is pre-trained on training data enriched with labels. In some embodiments, the method proposes determining one or more values of statistical features associated with data packets present in a data stream. A classification output may be produced by processing the one or more values of statistical features. The classification output may include the data packets classified into one or more categories.

Production of the classification output may further include extraction of one or more heuristics for each of the values of statistical features. The one or more heuristics may be compared with one or more conditional checks defined at each node within the data model. A cumulative score may be determined based on results of the comparison. The cumulative score may be determined by aggregating a score assigned to successful clearance of each conditional check. Such cumulative score may indicate an accuracy of the classification output. For example, the cumulative score may indicate the certainty with which the data model would have classified the data stream into a particular category.

The detailed description set forth below in connection with the appended drawings is intended as a description of various embodiments of the present disclosure and is not intended to represent the only embodiments in which details of the present disclosure may be implemented. Each embodiment described in this disclosure is provided merely as an example or illustration, and should not necessarily be construed as preferred or advantageous over other embodiments.

FIG. 1 illustrates a network implementation diagram of a system for classifying data and providing an accuracy of classification, in accordance with an embodiment of the present disclosure. Although several network devices would be configured within a computer network 100 illustrated in FIG. 1, only a network switch 102 is illustrated for the ease of illustration and explanation. The network switch 102 receives an incoming data stream 104 and forwards an outgoing data stream 106. The incoming data stream 104 may include data packets when the computer network 100 is a packet switched data network. In some embodiments, the data packets present in the incoming data stream 104 may be present in an encrypted format.

A processing device, such as a server 108, may be connected with the computer network 100 to receive a copy of the incoming data stream 104 received by the network switch 102. The server 108 may be configured to classify the incoming data stream 104 and provide an accuracy of classification. Although it is described that the entire processing may be performed on the server 108, it may be possible to implement this functionality on the network switch 102 itself or any other network device. Upon determining the classification output and the accuracy of classification, they may be presented on a user device, such as a monitor 110 or a smart phone, for providing real-time insights related to performance of the computer network 100 and/or network devices present in the computer network 100.

Figure 2:
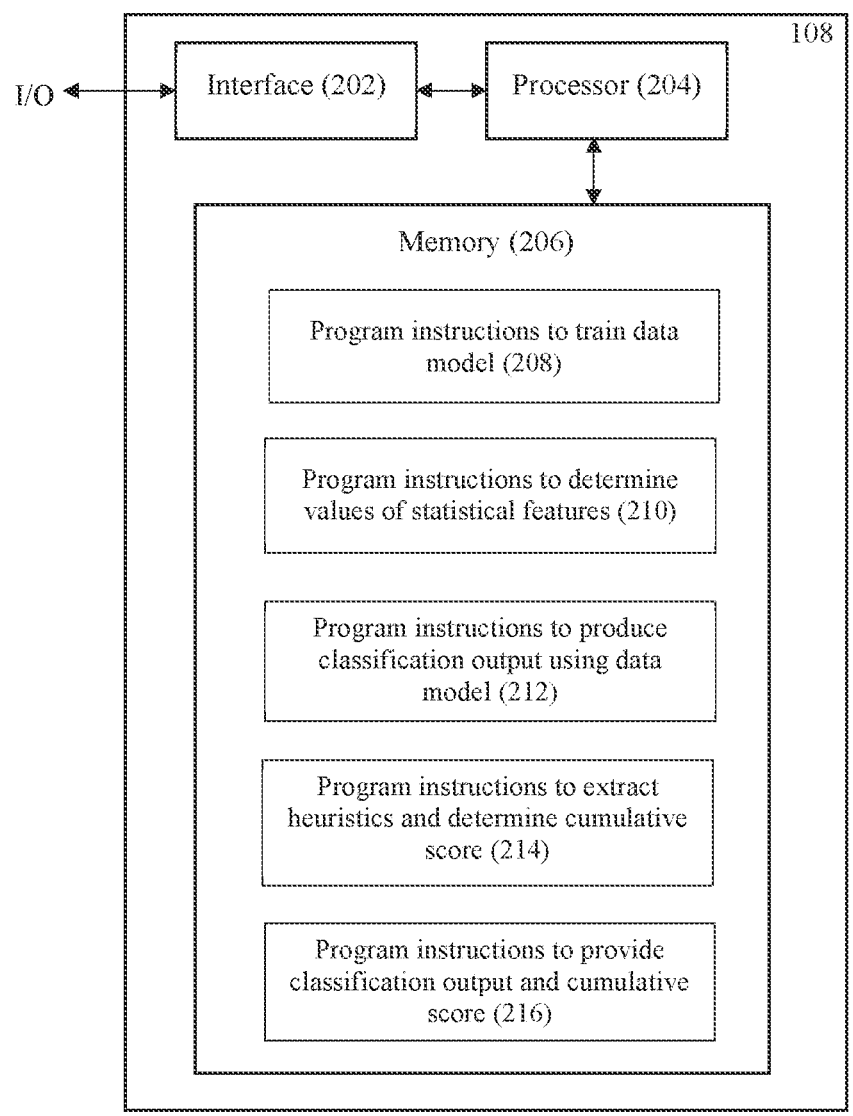
FIG. 2 illustrates a block diagram showing different components of a server for classifying data and providing an accuracy of classification, in accordance with an embodiment of the present disclosure.

FIG. 2 illustrates a block diagram showing different components of the server 108 used for classifying the incoming data stream 104 and providing an accuracy of classification, in accordance with an embodiment of the present disclosure. The server 108 may comprise an interface 202, a processor 204, and a memory 206. The memory 206 may store program instructions for performing several functions for classifying the incoming data stream 104 and providing an accuracy of classification. Specifically, the memory 206 may comprise program instructions for implementing different layers to store, process, and forward the incoming data stream 104. In some embodiments, the memory 206 may include program instructions to train data model 208, program instructions to determine values of statistical features 210, program instructions to produce classification output using data model 212, program instructions to extract heuristics and determine cumulative score 214, and program instructions to provide classification output and cumulative score 216. Functioning of the programmed instructions 208 through 216 will be discussed below with reference to FIG. 3, FIG. 4*a*, and FIG. 4*b*.

Figure 3:
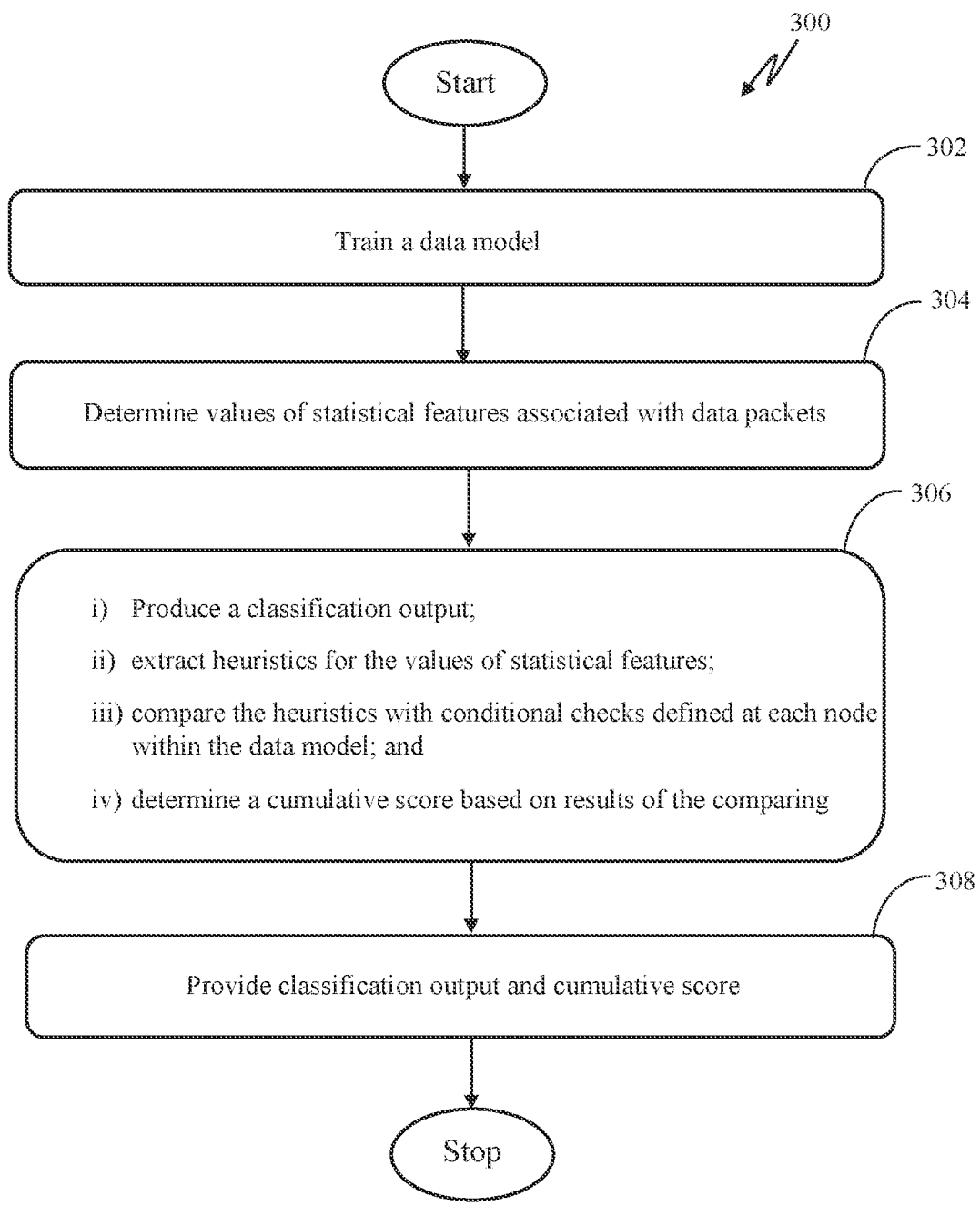
FIG. 3 illustrates a flowchart showing a method of classifying data and providing an accuracy of classification, in accordance with an embodiment of the present disclosure.

Referring now to FIG. 3, a method of classifying data and providing an accuracy of classification is described with reference to flowchart 300. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At step 302, a data model may be trained using suitable machine learning techniques, such as deep learning techniques. For example, the data model may be trained using Convolutional Neural Networks (CNNs), Recurrent Neural Networks (RNNs), Deep Reinforcement Learning (DRL), and/or autoencoders. The data model may be a mathematical representation of learning gathered from training data enriched with data labels. The data labels may be name of an application to which one or more data streams of the training data are associated, protocols associated with the one or more data streams, and similar other unique properties of the one or more data streams. The data model may include several child nodes connected with each other and/or a parent node. Weights or bias functions corresponding to the learning may be associated with each link present between the nodes. Post training, the data model may be executed on the server 108.

At step 304, the server 108 may receive the incoming data stream 104. The server 108 may be configured to process the data packets present in the incoming data stream 104. The data packets may be present in an encrypted format, for example when received through a Virtual Private Network (VPN) tunnel. For encrypting the data packets, the VPN tunnel may utilize a suitable protocol, such as IP security (IPSec), Internet Key exchange (IKE) version 1 or version 2, Virtual Extensible Local Area Network (VXLAN), Secure Shell (SSH) tunneling, Hyper Text Transfer Protocol (HTTP) tunneling, Internet Configuration Management Protocol (ICMP) tunneling, General Packet Radio Service (GPRS) Tunneling Protocol (GTP), and Multiprotocol Label Switching (MPLS) tunneling.

The system may process the data packets to determine values of statistical features associated with data packets. In some embodiments, the values of statistical features may be obtained from headers of the data packets and/or by analyzing properties associated with arrival of the data packets at a destination, within a predefined time window. The statistical features obtained from the header of the data packets may include mean packet length and standard packet length. Further, the statistical features obtained by analyzing properties associated with arrival of the data packets may include mean inter-arrival time, standard inter-arrival time, packets per second, and bits per second.

At step 306, values of the statistical features may be provided to the data model for producing a classification output. The classification output may correspond to the data packets being classified into one or more categories. For example, the data packets may be classified as belonging to Hyper Text Transfer Protocol (HTTP) stream or File Transfer Protocol (FTP) stream.

In one implementation, while producing the classification output, the data model may extract heuristics for the values of each of the statistical features, at step 306. In one or more implementations, the heuristics may include minimum value, mean positive standard value, mean negative standard value, and maximum value.

Further, at step 306, over each node present in the data model, the heuristics may be compared with one or more conditional checks defined at each node. For example, in a decision tree developed without pruning, a condition may be defined at each node. As data is traversed across the decision tree, from a root node to terminal/leaf nodes, adherence of the data to such conditions may be determined. In this manner, the data may be finally classified into one category based on matching of the data with the conditions. Successful traversal of a conditional check defined at each node may be associated with a score. As the nodes are traversed, such scores are accumulated, and a cumulative score may be determined while all the nodes of the decision tree are traversed.

At step 308, when all the nodes of the data model are traversed, a classification output along with the cumulative score may be provided. The cumulative score may be referred to as an explainability score, as it explains or provides details of the accuracy/confidence with which the output may be classified by the data model. Further, in different implementations, such explainability score may be determined by other mathematical operations, such as average, mean, and percentage.

Figures 4A, 4B:
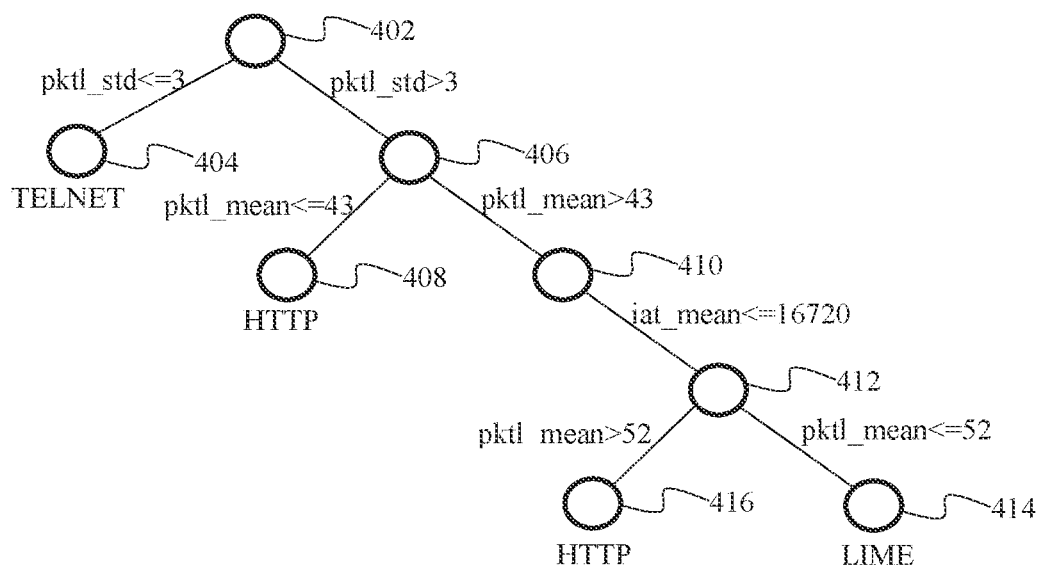
FIG. 4a illustrates an exemplary portion of program code of a decision tree implemented with a scoring mechanism, in accordance with an embodiment of the present disclosure.
FIG. 4b illustrates an exemplary portion of a decision tree corresponding to a scoring mechanism, in accordance with an embodiment of the present disclosure.

FIG. 4a illustrates an exemplary portion of program code of a decision tree implemented with a scoring mechanism, in accordance with an embodiment of the present disclosure. FIG. 4b illustrates an exemplary portion of the decision tree corresponding to a scoring mechanism, in accordance with an embodiment of the present disclosure. Referring cumulatively to FIG. 4a and FIG. 4b, the scoring mechanism is now described. FIG. 4b illustrates a decision tree including nodes 402 through 416. Each node is associated with a conditional check defined between a link present between the node and its previous node. For example, node 404 is associated with a conditional check of standard packet length (pktl_std) being less than or equal to three for classifying the data stream as belonging to TELNET class. Similarly, node 406 is associated with a conditional check of standard packet length (pktl_std) being greater than three, leading to further assessment of the data stream for mean packet length (pktl_mean) at nodes 408 and 410. The portion of the decision tree includes two rules (rule 1 and rule 2) defined at two leaf nodes i.e. nodes 408 and 414. The two rules are configured to identify data streams belonging to a Hyper Text Transfer Protocol (HTTP) class at the nodes 408 and 414. Both rules 1 and 2 share three common decision nodes (nodes 406, 408, and 408) after which a label/class of the data stream is concluded. Further, rule 2 traverses four additional nodes (nodes 410, 412, 414, and 416) to conclude on the label. Also, 'rule 1' uses two features i.e. standard packet length (pktl_std) and mean packet length (pktl_mean) to conclude the label 'HTTP' at node 408, and 'rule 2' uses three unique features i.e. standard packet length (pktl_std), mean packet length (pktl_mean), and mean inter-arrival time (iat_mean) to conclude the label 'HTTP' at node 416. In some embodiments, the explainability score may be determined as a ratio of 'number of features checked by the rule' to 'total number of features present in dataset'. Considering that a complete decision tree (whose portions are illustrated in FIG. 4a and FIG. 4b) is modeled on a dataset with six unique features, explainability score for 'rule 1' is 2/6 (=0.33) and for 'rule 2' is 3/6 (=0.5) respectively.

In one implementation, in a first case, when values of one or more statistical features lie between the mean positive standard deviation and the mean negative standard deviation, an explainability score of 0.6 may be assigned to the data stream. Through such explainability score, it may be determined that statistical properties of the data stream are closer to statistical properties of the training data for training the data model. In a second case, when the values of the one or more statistical features lie outside of mean positive standard deviation and mean negative standard deviation but is greater than minimum standard deviation and less than maximum standard deviation, an explainability score of 0.3 may be assigned to the data stream. Through such low explainability score of 0.3, it may be determined that the statistical properties are present in the training data but not in the data stream. Thus, the chances of misclassification of the data stream would be greater if the explainability score is low, e.g. 0.3. In a third case, when the values of the one or more statistical features lie outside of minimum standard deviation or maximum standard deviation, an explainability score of 0.1 may be assigned to the data stream. Through such low explainability score of 0.1, it may be determined that the data stream is associated with unseen values of statistical properties i.e. the values of one or more statistical properties of the data stream are present out of the one or more statistical properties of the training data, and thus accuracy of the classification output is low i.e. the chances of misclassification of the data stream are much higher.

FIG. 5 illustrates a table providing different values determined by the system for classifying data and providing an accuracy of classification, in accordance with an embodiment of the present disclosure. The table provides values of statistical features, heuristics, and explainability scores for an exemplary input vector. The exemplary input vector corresponds to a data stream provided as an input to the present system for classifying data and providing an accuracy of classification, in order to test performance of the system. The table illustrates intermediate explainability scores determined for features of the exemplary input vector by comparing the heuristics with the values of statistical features. The explainability score for the exemplary input vector would be determined as an average of the intermediate explainability scores i.e. an average of 0.3, 0.3, 0.3, 0.3, 0.6, and 0.6, which comes out to be 0.4.

The classification output and the explainability score obtained through disclosed methods may be used for data stream monitoring to address deviations, degradations, or violations in a communication network, which often result in anomalous or inefficient network operations. Based on the classification output and the explainability score, programmable measures could be taken by an administrator for shaping of data traffic. In one implementation, the programmable measures may be taken when the explainability score is present below a predefined threshold value, for example 0.4. The programmable measures may include storing the frequency of deviations, re-directing network traffic, port mirroring, or capturing live network packet data.

An embodiment of the disclosure may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense.

An interface may be used to provide input or fetch output from the server. The interface may be implemented as a Command Line Interface (CLI), Graphical User Interface (GUI). Further, Application Programming Interfaces (APIs) may also be used for remotely interacting with the server.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

What is claimed is:

1. A method comprising:
    determining one or more values of statistical features associated with data packets in a data stream;
    producing a classification output by processing the one or more values of statistical features through a data model, wherein the classification output includes the data packets classified into one or more categories of communication protocols, and wherein producing the classification output further includes:
        extracting one or more heuristics for each of the one or more values of statistical features;
        comparing the one or more heuristics with one or more conditional checks defined at each node within the data model; and
        determining a cumulative score based on results of the comparing, wherein the cumulative score is determined by aggregating a score assigned to successful clearance of each conditional check; and
    providing, to a user device, the classification output along with the cumulative score indicating accuracy of the classification output.

2. The method as claimed in claim 1, wherein the one or more values of statistical features are obtained from headers of the data packets.

3. The method as claimed in claim 1, wherein the data packets are present in an encrypted format.

4. The method as claimed in claim 3, wherein the one or more values of statistical features are determined from headers of the data packets.

5. The method as claimed in claim 3, wherein the one or more values of statistical features are determined by analyzing properties associated with arrival of the data packets at a destination, within a predefined time window.

6. The method as claimed in claim 1, wherein the statistical features are selected from a group consisting of mean packet length, standard packet length, mean inter-arrival time, standard inter-arrival time, packets per second, and bits per second.

7. The method as claimed in claim 1, wherein the one or more heuristics are selected from a group consisting of minimum value, mean positive standard value, mean negative standard value, and maximum value.

8. The method as claimed in claim 1, wherein the data model is trained using machine learning techniques comprising at least one of Convolutional Neural Networks (CNNs), Recurrent Neural Networks (RNNs), Deep Reinforcement Learning (DRL), and autoencoders.

9. The method as claimed in claim 1, further comprising modifying configurations of one or more network devices communicating the data stream, based on the classification output.

10. The method as claimed in claim 9, further comprising:
    determining that the cumulative score is present below a predefined threshold value; and
    responsive to the determination that the cumulative score is present below the predefined threshold value, performing one or more of storing frequency of deviations, re-directing network traffic, port mirroring, or capturing live network packet data.

11. A network device comprising:
    a processor and a memory coupled to the processor, wherein the memory stores programmed instructions, which when executed by the processor, causes the processor to:
        determine one or more values of statistical features associated with data packets in a data stream;
        produce a classification output by processing the one or more values of statistical features through a data model, wherein the classification output includes the data packets classified into one or more categories of communication protocols, and wherein producing the classification output further includes:
            extracting one or more heuristics for each of the one or more values of statistical features;
            comparing the one or more heuristics with one or more conditional checks defined at each node within the data model; and
            determining a cumulative score based on results of the comparing, wherein the cumulative score is determined by aggregating a score assigned to successful clearance of each conditional check; and
        provide, to a user device, the classification output along with the cumulative score indicating accuracy of the classification output.

12. The network device as claimed in claim 11, wherein the one or more values of statistical features are obtained from headers of the data packets.

13. The network device as claimed in claim 11, wherein the data packets are present in an encrypted format.

14. The network device as claimed in claim 13, wherein the one or more values of statistical features are collected from headers of the data packets.

15. The network device as claimed in claim 13, wherein the one or more values of statistical features are determined by analyzing properties associated with arrival of the data packets at a destination, within a predefined time window.

16. The network device as claimed in claim 11, wherein the statistical features are selected from a group consisting of mean packet length, standard packet length, mean inter-arrival time, standard inter-arrival time, packets per second, and bits per second.

17. The network device as claimed in claim 11, wherein the one or more heuristics are selected from a group consisting of minimum value, mean positive standard value, mean negative standard value, and maximum value.

18. The network device as claimed in claim 11, wherein the data model is trained using machine learning techniques comprising at least one of Convolutional Neural Networks (CNNs), Recurrent Neural Networks (RNNs), Deep Reinforcement Learning (DRL), and autoencoders.

19. The network device as claimed in claim 11, further comprising modifying configurations of one or more network devices communicating the data stream, based on the classification output.

20. A non-transitory machine-readable storage medium that stores instructions which, when executed by a processor, perform a plurality of operations comprising:

determining one or more values of statistical features associated with data packets in a data stream;

producing a classification output by processing the one or more values of statistical features through a data model, wherein the classification output includes the data packets classified into one or more categories of communication protocols, and wherein producing the classification output further includes:

extracting one or more heuristics for each of the one or more values of statistical features;

comparing the one or more heuristics with one or more conditional checks defined at each node within the data model; and determining a cumulative score based on results of the comparing, wherein the cumulative score is determined by aggregating a score assigned to successful clearance of each conditional check; and providing the classification output along with the cumulative score indicating accuracy of the classification output.

\* \* \* \* \*